US008150749B2

(12) United States Patent
Kahn et al.

(10) Patent No.: US 8,150,749 B2
(45) Date of Patent: Apr. 3, 2012

(54) SYSTEMS AND METHODS FOR GENERAL AGGREGATION OF CHARACTERISTICS AND KEY FIGURES

(75) Inventors: Markus Kahn, Walldorf (DE); Marcus Baumann, Sandhausen (DE)

(73) Assignee: SAP AG, Walldorf (DE)

( * ) Notice: Subject to any disclaimer, the term of this patent is extended or adjusted under 35 U.S.C. 154(b) by 225 days.

(21) Appl. No.: 12/461,615

(22) Filed: Aug. 18, 2009

(65) Prior Publication Data

US 2009/0313157 A1 Dec. 17, 2009

Related U.S. Application Data

(63) Continuation of application No. 11/239,139, filed on Sep. 30, 2005, now Pat. No. 7,596,520.

(60) Provisional application No. 60/614,401, filed on Sep. 30, 2004.

(51) Int. Cl.
*G06Q 40/00* (2006.01)

(52) U.S. Cl. ............. 705/35; 705/36 R; 705/38; 717/149

(58) Field of Classification Search .................. 707/102, 707/6; 717/149; 718/100; 725/87, 112; 348/E7.071, E17.111
See application file for complete search history.

(56) References Cited

U.S. PATENT DOCUMENTS

| 6,742,015 B1 | 5/2004 | Bowman-Amuah | |
|---|---|---|---|
| 2003/0229900 A1 | 12/2003 | Reisman | |
| 2005/0066321 A1* | 3/2005 | Nikitin et al. | 717/149 |
| 2005/0234960 A1* | 10/2005 | Chickering et al. | 707/102 |

OTHER PUBLICATIONS

Lienberger W. et al., "Multi-Capacity Bin Packing Algorithms with Applications to Job Scheduling Under Multiple Constraints," University of Minnesota, Computer Science and Engineering, Technical Report, No. 99-24, May 27, 1999, pp. 1-23.
Csirik J. et al., "On-line Packing and Covering Problems," Lecture Notes in Computer Science, Springer Verlag, vol. 1442, 1998, pp. 147-195.
Maruyama et al., "A General Packing Algorithm for Multidimensional Resource Requirements," International Journal of Information and Computer Sciences, Plenum Publishing Corporation, vol. 6, No. 2, Jun. 1977, pp. 131-149.
Coffman E.G. et al., "Approximation Algorithms for Bin Packing: A Survey," Approximation Algorithms for NP-Hard Problems, 1996, pp. 1-53.
Galambos G. et al., "Repacking Helps in Bounded Space On-line Bin-Packing," Computing, Springer Verlag, vol. 49, No. 4, 1993, pp. 329-338.
Aggarwal G. et al., "The Load Rebalancing Problem," SPAA 2003, 15th Annual ACM Symposium on Parallel Algorithms and Architectures, Jun. 7, 2003, pp. 258-265.
Communication and Search Report from the European Patent Office, dated, Nov. 7, 2005 (8 pages).

* cited by examiner

*Primary Examiner* — Behrang Badii
(74) *Attorney, Agent, or Firm* — Finnegan, Henderson, Farabow, Garrett & Dunner LLP

(57) ABSTRACT

Computer-implemented methods, computer systems, and computer programs product are provided for automated generic and parallel aggregation of characteristics and key figures of unsorted mass data being of specific economic interest, particularly associated with financial institutions, and with financial affairs in banking practice. The parallel aggregation may reduce the amount of data for a customer defined granularity for the purpose of facilitating the handling of raw data related to all areas of credit risk management in banking practice. Moreover, the computing power of software and the software performance run time, respectively, may be improved in the case of mass data.

20 Claims, 12 Drawing Sheets

| fields of granularity characteristics | | | | | fields of key figures | | |
|---|---|---|---|---|---|---|---|
| rating method | rating segment | business partner | rating date | rating classification | financial statement key figure 1 | financial statement key figure 2 | currency |
| credit institutions | public banks | GP_SK_01 | 1-Jan-2002 | AAA | 8149 | 484449 | EUR |
| credit institutions | public banks | GP_SK_02 | 1-Jan-2002 | BBB | 2860 | 456825 | EUR |
| credit institutions | public banks | GP_SK_03 | 1-Jan-2002 | CCC | 3254 | 693677 | EUR |
| credit institutions | private banks | GP_LB_04 | 1-Jan-2002 | AAA | 1912 | 809485 | EUR |
| credit institutions | private banks | GP_LB_05 | 1-Jan-2002 | AAA | 6135 | 166310 | EUR |
| credit institutions | private banks | GP_LB_06 | 1-Jan-2002 | BBB | 3393 | 542616 | EUR |
| insurances | life insurances | GP_LV_07 | 1-Jan-2002 | BBB | 8715 | 247374 | EUR |
| insurances | life insurances | GP_LV_08 | 1-Jan-2002 | BBB | 5966 | 670365 | EUR |
| insurances | life insurances | GP_LV_09 | 1-Jan-2002 | AAA | 1620 | 865860 | EUR |
| insurances | casualty insurances | GP_UV_10 | 1-Jan-2002 | BBB | 8683 | 824001 | EUR |
| insurances | casualty insurances | GP_UV_11 | 1-Jan-2002 | BBB | 3346 | 729541 | EUR |
| insurances | casualty insurances | GP_UV_12 | 1-Jan-2002 | CCC | 8916 | 35040 | EUR |

Fig. 4A granularity characteristics /
granularity levels i of granularity characteristics; i=4

| credit institutions | private banks |
|---|---|
| credit institutions | public banks |
| insurances | life insurances |
| insurances | casualty insurances |

Fig. 4B

Aggregation example:
package size 4;

granularity characteristic
rating method
rating segment keyfigure Xj                        Operator j
financial statement key figure 1    Sum
financial statement key figure 2    Minimum form of sorting                     direction of sorting Search result

| fields of granularity characteristics | | business partner | rating date | rating classification | fields of key figures; | | currency |
|---|---|---|---|---|---|---|---|
| rating method | rating segment | | | | financial statement key figure 1 | financial statement key figure 2 | |
| credit institutions | private banks | | | | ??? | ??? | ??? |
| credit institutions | public banks | | | | ??? | ??? | ??? |
| insurances | life insurances | | | | ??? | ??? | ??? |
| insurances | casualty insurances | | | | ??? | ??? | ??? |

Fig. 5

Aggregation example:
package size for main packages 8; package size for sub package 3;

granularity characteristic
rating method
rating segment

| keyfigure Xj | Operator j |
|---|---|
| financial statement key figure 1 | Sum |
| financial statement key figure 2 | Minimum | form of sorting      direction of sorting search result

| fields of granularity characteristics; | | | | | fields of key figures; | | |
|---|---|---|---|---|---|---|---|
| rating method | rating segment | business partner | rating date | rating classification | financial statement key figure 1 | financial statement key figure 2 | currency |
| credit institutions | private banks | | | | ??? | ??? | ??? |
| credit institutions | public banks | | | | ??? | ??? | ??? |
| insurances | life insurances | | | | ??? | ??? | ??? |
| insurances | casualty insurances | | | | ??? | ??? | ??? |

Fig. 6

Step: 200    raw data shown in the work list of Fig. 4 are exemplarily arranged by the key figures in the column "financial statement key figure 1" in ascending order so as to demonstrate a work list of unsorted records to begin with;

package size = 4;

| rating method | rating segment | business partner | rating date | rating classification | Sum financial statement key figure 1 | Minimum financial statement key figure 2 | currency | package |
|---|---|---|---|---|---|---|---|---|
| insurances | life insurances | GP_LV_09 | 1-Jan-2002 | AAA | 1620 | 865860 | EUR | 1 |
| credit institutions | private banks | GP_LB_04 | 1-Jan-2002 | AAA | 1912 | 809485 | EUR | 1 |
| credit institutions | public banks | GP_SK_02 | 1-Jan-2002 | BBB | 2860 | 456825 | EUR | 1 |
| credit institutions | public banks | GP_SK_03 | 1-Jan-2002 | CCC | 3254 | 693677 | EUR | 1 |
| insurances | casualty insurances | GP_UV_11 | 1-Jan-2002 | BBB | 3346 | 729541 | EUR | 2 |
| credit institutions | private banks | GP_LB_06 | 1-Jan-2002 | BBB | 3393 | 542616 | EUR | 2 |
| insurances | life insurances | GP_LV_08 | 1-Jan-2002 | BBB | 5966 | 670365 | EUR | 2 |
| credit institutions | private banks | GP_LB_05 | 1-Jan-2002 | AAA | 6135 | 166310 | EUR | 2 |
| credit institutions | public banks | GP_SK_01 | 1-Jan-2002 | AAA | 8149 | 484449 | EUR | 3 |
| insurances | casualty insurances | GP_UV_10 | 1-Jan-2002 | BBB | 8683 | 824001 | EUR | 3 |
| insurances | life insurances | GP_LV_07 | 1-Jan-2002 | BBB | 8715 | 247374 | EUR | 3 |
| insurances | casualty insurances | GP_UV_12 | 1-Jan-2002 | CCC | 8916 | 35040 | EUR | 3 |

Step: 210    Iteration Nr. 1    sorting within packages according to customized granularity levels, subsequently aggregating;

| rating method | rating segment | business partner | rating date | rating classification | Sum financial statement key figure 1 | Minimum financial statement key figure 2 | currency | package |
|---|---|---|---|---|---|---|---|---|
| credit institutions | private banks | | | | 1912 | 809485 | EUR | 1 |
| credit institutions | public banks | | | | 6114 | 456825 | EUR | 1 |
| insurances | life insurances | | | | 1620 | 965860 | EUR | 1 |
| credit institutions | private banks | | | | 9528 | 166310 | EUR | 2 |
| insurances | life insurances | | | | 5966 | 670365 | EUR | 2 |
| insurances | casualty insurances | | | | 3346 | 729541 | EUR | 2 |
| credit institutions | public banks | | | | 8149 | 484449 | EUR | 3 |
| insurances | life insurances | | | | 8715 | 247374 | EUR | 3 |
| insurances | casualty insurances | | | | 17599 | 35040 | EUR | 3 |

Fig. 7A

Step:

a  220  not in parallel  comparison of packages and assignment for rebuilding;

key of the last record of data package 1 us greater than the key of the first record of data package 2, and key of the first record of data package 1 is less than the key of the first record of data package 2, or in other words interpreted, the key of the first record of data package 2 is an element of data package 1;

b  package size: data package 1 includes 3 records, data package 2 includes 3 records, new data package 1 includes 6 records (exceeding of max. package size is acceptable)

Step:

230  Iteration Nr. 2  parallel reorganization of records, thereafter sorting of records within packages;

| rating method | rating segment | business partner | rating date | rating classification | Sum financial statement key figure 1 | Minimum financial statement key figure 2 | currency | old package | new package |
|---|---|---|---|---|---|---|---|---|---|
| credit institutions | private banks | | | | 1912 | 809485 | EUR | 1 | 1 |
| credit institutions | private banks | | | | 9528 | 166310 | EUR | 2 | 1 |
| credit institutions | public banks | | | | 6114 | 456825 | EUR | 1 | 1 |
| insurances | life insurances | | | | 1620 | 865860 | EUR | 2 | 1 |
| insurances | life insurances | | | | 5966 | 670365 | EUR | 2 | 1 |
| insurances | casualty insurances | | | | 3346 | 729541 | EUR | 2 | 1 |
| credit institutions | public banks | | | | 8149 | 484449 | EUR | 3 | 2 |
| insurances | life insurances | | | | 8715 | 247374 | EUR | 3 | 2 |
| insurances | casualty insurances | | | | 17599 | 35040 | EUR | 3 | 2 |

Iteration Nr. 2  now aggregating;

| rating method | rating segment | business partner | rating date | rating classification | financial statement key figure 1 | financial statement key figure 2 | currency | package |
|---|---|---|---|---|---|---|---|---|
| credit institutions | private banks | | | | 11400 | 166310 | EUR | 1 |
| credit institutions | public banks | | | | 6114 | 456825 | EUR | 1 |
| isurances | life insurances | | | | 7586 | 670365 | EUR | 1 |
| insurances | casualty insurances | | | | 3346 | 729541 | EUR | 1 |
| credit institutions | public banks | | | | 8149 | 484449 | EUR | 2 |
| insurances | life insurances | | | | 8715 | 247374 | EUR | 2 |
| insurances | casualty insurances | | | | 17599 | 35040 | EUR | 1 |

Fig. 7B

Step:

240 not in parallel — comparison of packages and assignment for rebuilding;

key of the last record of data package 1 is greater than the key of the first record of data package 2, and key of the first record of data package 1 is less than the key of the first record of data package 2, or in other words interpreted, the key of the first record of data package 2 is an element of data package 1; package size: data package 1 includes 4 records, data package 2 includes 3 records, new data package 1 includes 7 records (exceeding of max. package size is acceptable)

Step:

250 Iteration Nr. 3 — parallel reorganization of records, thereafter sorting of records within packages;

| rating method | rating segment | business partner | rating date | rating classification | Sum financial statement key figure 1 | Minimum financial statement key figure 2 | currency | old package | new package |
|---|---|---|---|---|---|---|---|---|---|
| Kreditinstitute | private banks | | | | 1140 | 166310 | EUR | 1 | 1 |
| Kreditinstitute | public banks | | | | 6114 | 456825 | EUR | 1 | 1 |
| Kreditinstitute | public banks | | | | 8149 | 484449 | EUR | 2 | 1 |
| Versicherungen | life insurances | | | | 7586 | 670365 | EUR | 1 | 1 |
| Versicherungen | life insurances | | | | 8715 | 247374 | EUR | 2 | 1 |
| Versicherungen | casualty insurances | | | | 3346 | 729541 | EUR | 1 | 1 |
| Versicherungen | casualty insurances | | | | 17599 | 35040 | EUR | 2 | 2 |

Iteration Nr. 3 — now aggregating;

| rating method | rating segment | business partner | rating date | rating classification | financial statement key figure 1 | financial statement key figure 2 | currency | package |
|---|---|---|---|---|---|---|---|---|
| Kreditinstitute | private banks | | | | 11400 | 166310 | EUR | 1 |
| Kreditinstitute | public banks | | | | 14263 | 456825 | EUR | 1 |
| Versicherungen | casualty insurances | | | | 16301 | 247374 | EUR | 2 |
| Versicherungen | casualty insurances | | | | 20945 | 35040 | EUR | 1 |

Step:

260 not in parallel — comparison of packages and assignment for rebuilding;

the aggregation algorithm terminates at this point, since there is no other adjacent data package remaining, whose first key is an element of any other data package;
in this case only one data package remains;
generally interpreting the termination criterion, all the data packages are disjoint with regard to the granularity characteristics.

Fig. 7C

Step: 200 raw data shown in the work list of Fig. 4 are exemplarily arranged by the key figures in the column "financial statement key figure 1" in ascending order so as to demonstrate a work list of unsorted records to begin with;

package size = 8, sub package size 3

| rating method | rating segment | business partner | rating date | rating classification | Sum financial statement key figure 1 | Minimum financial statement key figure 2 | currency | package |
|---|---|---|---|---|---|---|---|---|
| insurances | life insurances | GP_LV_09 | 1-Jan-2002 | AAA | 1620 | 865860 | EUR | 1 |
| credit institutions | private banks | GP_LB_04 | 1-Jan-2002 | AAA | 1912 | 809485 | EUR | 1 |
| credit institutions | public banks | GP_SK_02 | 1-Jan-2002 | BBB | 2860 | 456825 | EUR | 1 |
| credit institutions | public banks | GP_SK_03 | 1-Jan-2002 | CCC | 3254 | 693677 | EUR | 1 |
| insurances | casualty insurances | GP_UV_11 | 1-Jan-2002 | BBB | 3346 | 729541 | EUR | 2 |
| credit institutions | private banks | GP_LB_06 | 1-Jan-2002 | BBB | 3393 | 542616 | EUR | 2 |
| insurances | life insurances | GP_LV_08 | 1-Jan-2002 | BBB | 5966 | 670365 | EUR | 2 |
| credit institutions | private banks | GP_LB_05 | 1-Jan-2002 | AAA | 6135 | 166310 | EUR | 2 |
| credit institutions | public banks | GP_SK_01 | 1-Jan-2002 | AAA | 8149 | 484449 | EUR | 3 |
| insurances | casualty insurances | GP_UV_10 | 1-Jan-2002 | BBB | 8683 | 824001 | EUR | 3 |
| insurances | life insurances | GP_LV_07 | 1-Jan-2002 | BBB | 8715 | 247374 | EUR | 3 |
| insurances | casualty insurances | GP_UV_12 | 1-Jan-2002 | CCC | 8916 | 35040 | EUR | 3 |

Fig. 8A

Step: 210 Iteration Nr. 1 sorting within packages for granularity characteristics, thereafter aggregating

| rating method | rating segment | business partner | rating date | rating classification | Sum financial statement key figure 1 | Minimum financial statement key figure 2 | currency | package |
|---|---|---|---|---|---|---|---|---|
| credit institutions | private banks | | | | 11440 | 166310 | EUR | 1 |
| credit institutions | public banks | | | | 6114 | 456825 | EUR | 1 |
| insurances | life insurances | | | | 7586 | 670365 | EUR | 1 |
| insurances | casualty insurances | | | | 3346 | 729541 | EUR | 1 |
| credit institutions | public banks | | | | 8149 | 484449 | EUR | 2 |
| insurances | life insurances | | | | 8715 | 247374 | EUR | 2 |
| insurances | casualty insurances | | | | 8683 | 824001 | EUR | 2 |
| insurances | casualty insurances | | | | 8916 | 35040 | EUR | 2 |

Iteration Nr. 1 Storing with sub package size 3

| rating method | rating segment | business partner | rating date | rating classification | financial statement key figure 1 | financial statement key figure 2 | currency | package old | package new |
|---|---|---|---|---|---|---|---|---|---|
| credit institutions | private banks | | | | 1140 | 166310 | EUR | 1 | 1 |
| credit institutions | public banks | | | | 6114 | 456825 | EUR | 1 | 1 |
| insurances | life insurances | | | | 7586 | 670365 | EUR | 1 | 1 |
| insurances | casualty insurances | | | | 3346 | 729541 | EUR | 1 | 2 rest of package 1 |
| credit institutions | public banks | | | | 8149 | 484449 | EUR | 2 | 3 |
| insurances | life insurances | | | | 8715 | 247374 | EUR | 2 | 3 |
| insurances | casualty insurances | | | | 8683 | 824001 | EUR | 2 | 3 |
| insurances | casualty insurances | | | | 8916 | 35040 | EUR | 2 | 4 rest of package 2 |

Step: 220 not in parallel   comparison of packages and assignment for rebuilding;

a checking of disjoit packages;
data package 1 and data package 2 have no intersection;
data package 1 and data package 3 intersect, thus they are marked; new package size 3+3=6 (thus still < 8);
data package 1 and data package 4 have no intersection;
key of data package 2 is equal to key of data package 4, i.e. both packages are not disjoint;
thus data packages 2 and 4 are marked (new package size: 1 + 1 = 2 data records);

b restoring maximum package size;
the new package 1 + 3 includes only 6 data records, thus the new package 2 + 4 is added: in total 8 data records;
thus in all only 1 new data package is generated;

Fig. 8B

Step: 230 Iteration Nr. 2 parallel rebuilding of data packages, thereafter sorting within packages

| rating method | rating segment | business partner | rating date | rating classification | Sum financial statement key figure 1 | Minimum financial statement key figure 2 | currency | package old | package new |
|---|---|---|---|---|---|---|---|---|---|
| credit institutions | private banks | | | | 11440 | 166310 | EUR | 1 | 1 |
| credit institutions | public banks | | | | 6114 | 456825 | EUR | 1 | 1 |
| credit institutions | public banks | | | | 8149 | 484449 | EUR | 3 | 1 |
| insurances | life insurances | | | | 7586 | 670365 | EUR | 1 | 1 |
| insurances | life insurances | | | | 8715 | 247374 | EUR | 3 | 1 |
| insurances | casualty insurances | | | | 3346 | 729541 | EUR | 2 | 1 |
| insurances | casualty insurances | | | | 8683 | 824001 | EUR | 3 | 1 |
| insurances | casualty insurances | | | | 8916 | 35040 | EUR | 4 | 1 |

Iteration Nr. 2  now aggregating;

| rating method | rating segment | business partner | rating date | rating classification | financial statement key figure 1 | financial statement key figure 2 | currency | package |
|---|---|---|---|---|---|---|---|---|
| credit institutions | private banks | | | | 11400 | 166310 | EUR | 1 |
| credit institutions | public banks | | | | 14263 | 456825 | EUR | 1 |
| insurances | life insurances | | | | 16301 | 247374 | EUR | 2 |
| insurances | casualty insurances | | | | 20945 | 35040 | EUR | 1 |

Step: 240 not in parallel comparison of packages and assignment for rebuilding;

the aggregation algorithm terminates at this point, since there is no other adjacent data package remaining, whose first key is an element of any other data package;
in this case only one data package remains;
generally interpreting the termination criterion, all the data packages are disjoint with regard to the granularity characteristics.

Fig. 8C

SYSTEMS AND METHODS FOR GENERAL
AGGREGATION OF CHARACTERISTICS
AND KEY FIGURES

RELATED APPLICATION

This application is a continuation of U.S. patent application No. 11/239,139, filed Sep. 30, 2005 now U.S. Pat. No. 7,596,520, and now allowed, which claims the benefit of priority from U.S. Provisional Application No. 60/614,401, entitled "Systems and Methods for General Aggregation of Characteristics of Key Figures" filed Sep. 30, 2004, the disclosures of which are expressly incorporated herein by reference in their entirety.

I. TECHNICAL FIELD

The present invention generally relates to electronic data processing. More particularly, the invention relates to computer-implemented methods, computer systems and computer program products for automated generic and/or parallel aggregation of characteristics and key figures of mass data associated with, for example, financial institutions and with financial affairs in banking practice.

II. BACKGROUND

As international financial markets expand, global concerns over the soundness of banking practices are driving stringent new requirements for bank-level management, regulatory control, and market disclosure.

Data processing systems in banking are provided with software tools, for example, SAP proprietary software tool solutions in banking such as the SAP solution for the new Basel Capital Accord (Basel II) that builds on the proven capabilities of the SAP for Banking solution portfolio, that enable financial entities and other users to pursue these requirements.

The SAP solution for the new Basel Capital Accord (Basel II) represents a risk-sensitive framework that provides capabilities for calculating risk exposure and capital, for managing market risk, interest risk, or liquidity risk, and for calculating and managing all areas of credit risk, helping to facilitate the handling of mass data, particularly being of specific economic interest and associated with financial institutions and with financial affairs in banking practice.

Moreover, software tool solutions for banking systems including capabilities for computing descriptive statistics are needed to efficiently analyze large amounts of given data (mass data) while managing large and complex projects. Within that scope, mass data are often required to be aggregated according to a customer defined granularity. Accordingly, aggregations can be computed for characteristics (lexicographic min, max) and key figures (min, max, count, sum, avg, variance, std, var %) using prior art software tool solutions.

However, there still remains the need to improve the computing power of software and software performance (i.e., run time performance), respectively and, in particular, when it comes to large amounts of data (mass data) to be aggregated effectively that can not be handled in the main memory of a data processor.

SUMMARY

Embodiments consistent with the present invention meet the above-identified needs by providing, for example, computer-implemented methods for automated generic and parallel aggregation of characteristics and key figures of mass data, particularly associated with banking practice, that can be easily integrated into existing credit risk platforms such as, for example, the above mentioned SAP solution for Basel II.

Embodiments of the present invention also relate to computer systems and computer program products for automated generic and parallel aggregation of characteristics and key figures of mass data. Further, embodiments of the invention relate to data carriers readable by a computer, the data carrier storing a plurality of instructions implemented by a computer program for causing the processing means of a computer system to execute computer-implemented methods and/or other embodiments of the present invention.

Moreover, an embodiment of the present invention provides a computer-implemented method for automated generic and parallel aggregation of characteristics and key figures of mass data associated with banking practice, that are not assumed to be a priori sorted in respect to a free selectable granularity before applying the computer-implemented method.

An embodiment of the present invention also provides a computer-implemented method that can optionally perform the automated generic aggregation of data either in linear or in parallel processing mode, thereby noticeably improving the computing power of software, as preferably in the case of mass data, depending on the capacity utilization of a data processing system.

In accordance with the invention as embodied and broadly described herein, a computer-implemented method may be provided for automated generic and parallel aggregation of characteristics and key figures of mass data whose structure is unknown, particularly associated with financial institutions and with financial affairs in banking practice, provided by different databases of different data sources. The inventive method may reduce the amount of data to a customer defined granularity by computing aggregations on key figures within the scope of an iterative process, repeatedly processing a parallel aggregation algorithm including parallel processing steps for merging, reorganizing, sorting and aggregating data records.

In one embodiment of the present invention, the aggregation may be computed on predetermined key figures using predetermined aggregation operations selected from a function pool and/or customer defined aggregation operations may be defined by input means using the predetermined aggregation operations.

In another embodiment of the invention, the aggregation is computed on customer defined key figures to be defined by input means using the predetermined aggregation operations selected from a function pool and using the predetermined aggregation operations and/or said customer defined aggregation operations.

In yet another embodiment of the invention, the aggregation algorithm can run in parallel processing mode for mass data, thereby noticeably improving the computing power of software, but if required, depending on the capacity utilization of a data processing system, the processing of the aggregation algorithm can optionally run in linear processing mode.

According to another embodiment of the invention, the aggregation algorithm of the present invention can easily be integrated into other processes, e.g., as a pre-processing before a data extraction of business area information to a business information warehouse of a company, thereby separating the results of already aggregated mass data for the purpose of visualizing data of specific economic interest.

According to still another embodiment of the present invention, the aggregation algorithm can be applied to prior art software solutions in the context of an ad hoc reporting for descriptive statistics.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings:

FIG. 4a illustrates an example of use for raw data, showing a work list of M=12 data records associated with financial institutions and with financial affairs in banking practice;

FIG. 4b illustrates an example of granularity characteristics/granularity levels i of granularity characteristics;

FIG. 5 illustrates an example of use for the parallel aggregation algorithm illustrated in FIG. 2, wherein the original amount of data records shown in FIG. 4a is reduced to N=4<M=12 data records for a customer defined granularity as it is set out in FIG. 5 referring to "search result";

FIG. 6 illustrates an example of use for the parallel aggregation algorithm illustrated in FIG. 2, wherein the original amount of data records shown in FIG. 4a is reduced to N=4<M=12 data records for a customer defined granularity as it is set out in FIG. 5 referring to "search result", and wherein another compromise of performance is made compared to the preceding example of use of FIG. 5;

FIGS. 7A-7C illustrate an example of a work list, consistent with an embodiment of the present invention; and FIGS. 8A-8C illustrate another example of a work list, consistent with an embodiment of the present invention.

DETAILED DESCRIPTION

Figure 1:
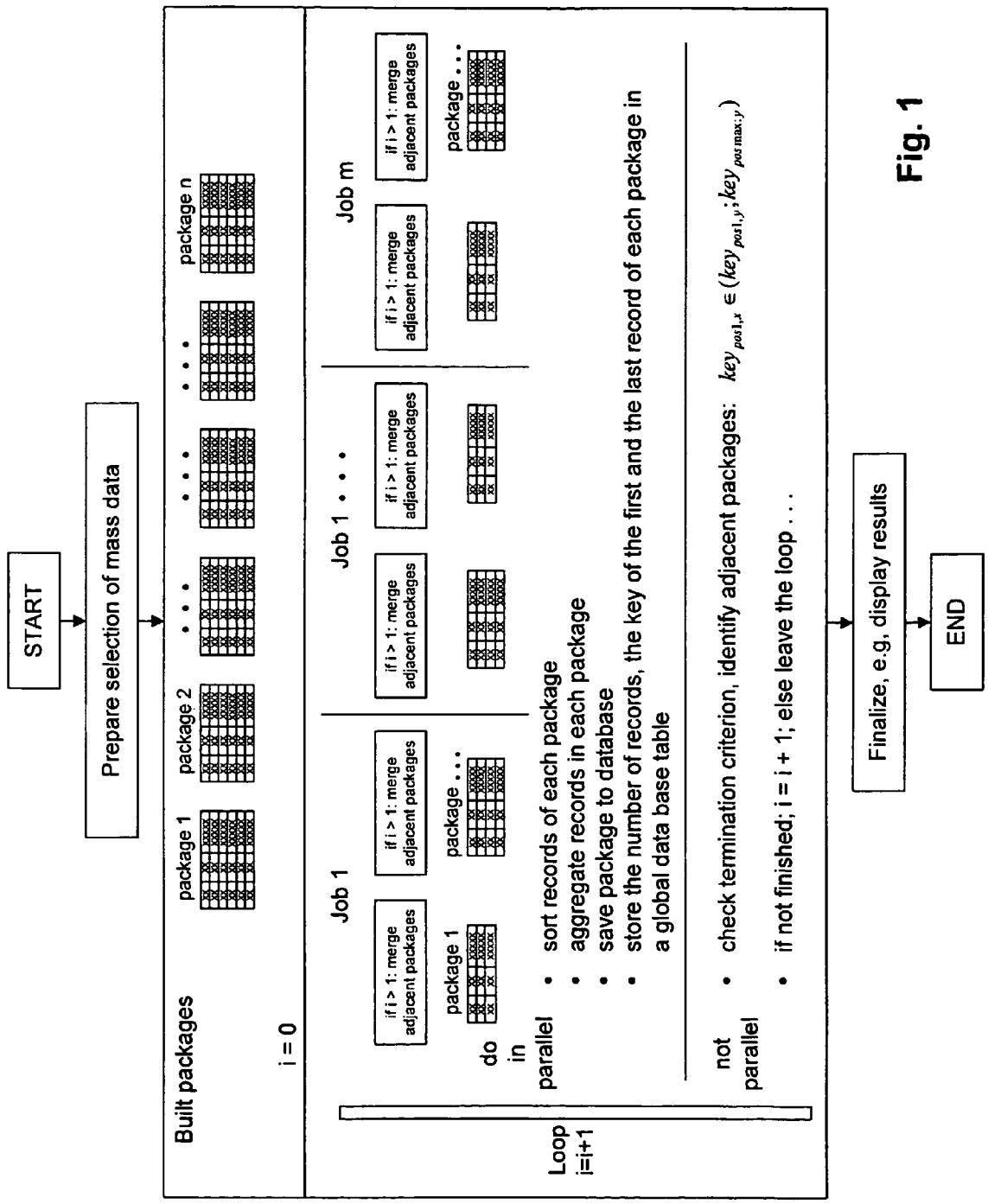
FIG. 1 illustrates a schematic view of an exemplary computer-implemented method for automated generic and parallel aggregation of characteristics and key figures of unsorted mass data.

Reference will now be made in detail to the present invention, examples of which are illustrated in the accompanying drawings in which like reference numbers refer to corresponding elements.

The present invention does not only relate to computer-implemented methods for automated generic and parallel aggregation of characteristics and key figures of unsorted mass data associated with financial institutions and with financial affairs, but also to data processing systems, computer program products that can be stored on a computer readable data carrier, and data carriers.

Data processing systems (computer systems) consistent with embodiments of the invention may comprise a single data processor or a plurality of data processors via inter-computer network, each data processor including processing means (processor), storage means (memory), bus means (bus), network means (network), interface means, input means and output means (input and output devices). The computer system may also be simply a server.

The data processor is, for example, a conventional desktop computer, a multiprocessor computer, or the like. The processor is, for example, a Central Processing Unit (CPU), a Micro Controller Unit (MCU), Digital Signal Processor (DSP), or the like.

Storage means are in particular provided for storing the specified mass data. Storage means symbolizes any memory means for temporarily or permanently storing data and instructions. Although memory is conveniently illustrated as part of computer, memory function may also be implemented in network, in computers and in processor itself, e.g. cache, register, or elsewhere. Memory can be, for example, a Read Only Memory (ROM), Random Access Memory (RAM), or a memory with other access options. Memory is physically implemented by computer-readable media, for example: (a) magnetic media, such as hard disk, floppy disk or other magnetic disk, tape or cassette tape; (b) optical media, such as optical disk (CD-ROM, DVD); (c) semiconductor media, like DRAM, SRAM, EPROM, EEPROM, or the like.

Memory means may further store support modules, for example, a Basic Input Output System (BIOS), an Operating system (OS), a program library, a compiler or interpreter, and a text processing tool.

Input means symbolizes any device for providing data and instructions for processing by computer, for example, a keyboard or pointing device such as a mouse, trackball or cursor direction key.

Output means symbolizes any device for presenting results of aggregated data packages, for example, a monitor or a display, for example, a Cathode Ray Tube (CRT), Flat Panel Display, Liquid Crystal Display (LCD), or printer.

Bus and network provide logical and physical connections by conveying data and instruction signals. While connections inside computer are conveniently referred to as "bus", connections between computers are referred to as "inter-computer network". Optionally, network comprises gateways being devices (computers) that specialize in data transmission and protocol conversion, allowing users working in one network to access another network.

Networking environments (as network) are commonplace in offices, enterprise-wide computer networks, intranets and the internet (i.e. world wide web). Network can be a wired or wireless network. To name a few network implementations, network is, for example, a local area network (LAN), a wide area network (WAN), a public switched telephone network (PSTN), an Integrated Services Network (ISDN), an infra-red (IR) link, a radio link, like Universal Mobile Tele-communications System (UMTS), Global System for Mobile Communication (GSM), Code Division Multiple Access (CDMA), or satellite link.

Transmission protocols and data formats are known as, for example, transmission control protocol/internet protocol (TCP/IP), hyper text transfer protocol (HTTP), secure HTTP, wireless application protocol, unique resource locator (URL), unique resource identifier (URI), hyper text markup language HTML, extensible markup language XML, extensible hyper text markup language XHTML, wireless application markup language (WML), etc.

Interface means (interfaces) for linking together the data processing units of a data processing system are well known in the art. An interface can be, for example, a serial port interface, a parallel port interface, a universal serial bus (USB) interface, an internal or external modem.

Computer program products consistent with embodiments of the invention may comprise a plurality of instructions for causing the processing means of a computer system to execute the method steps of the invention specified hereinafter with more detail. In other words, computer program product defines the operation of computer and its interaction in inter-computer network. For example, a computer program product may be available as source code in any programming language, and as object code (binary code) in a compiled form. Persons skilled in the art can use computer program products in connection with any of support modules (e.g. compiler, interpreter, operating system). The computer program products may be stored in memory hereinafter referred to as data carrier.

For the communication between computer program products and computers, data carriers may be conveniently inserted into an input device. A data carrier may be implemented as any computer readable medium. Generally, a data carrier is an article of manufacture comprising a computer readable medium having readable program code means embodied therein for executing the method steps of the present invention. Furthermore, program signals can also embody computer programs. Program signals may be transmitted via inter-computer network(s) to a data processor.

FIG. 1 illustrates a schematic view of an exemplary computer-implemented method, consistent with an embodiment of the invention. The exemplary method may be used for automated generic and parallel aggregation of characteristics and key figures of unsorted mass data, in particular being of specific economic interest and associated with financial institutions and with financial affairs in banking practice. The mass data ("input data") whose structure is unknown include a plurality of M data records, wherein M represents a large amount of data records to be aggregated that can not be handled in the main memory of a data processor. The mass data ("input data") may further comprise packetized blocks of data provided by different databases of different accessible data sources, including sets of rows and sets of columns, each row corresponding to a record, and the columns including fields of predetermined granularity characteristics and fields of predetermined key figures. Generally speaking, the generic aggregation of characteristics and key figures aims at the reduction of said mass data according to a given customized granularity. Due to the plurality of M data records, said mass data are customized as packages including $M_p < M$ data records as it is illustrated in the upper block of FIG. 1 referred to as "Built packages" before being assigned to the parallel aggregation algorithm. The built data packages (package 1, package 2, ... package n) are assigned to different jobs so that each job includes a plurality of data packages. A job or a plurality of jobs can be processed in a parallel processing mode, thereby noticeably improving the computing power and run time performance of software, respectively, either using a single data processor or a network of data processors by applying the method steps illustrated in the lower block of FIG. 1. But if required, depending on the capacity utilization of a data processing system, the processing of said aggregation algorithm can optionally run in linear processing mode, thereby aggregating and merging packages within a job sequentially. The method steps of the aggregation algorithm illustrated in the lower block of FIG. 1 are explained in detail below.

Figure 2:
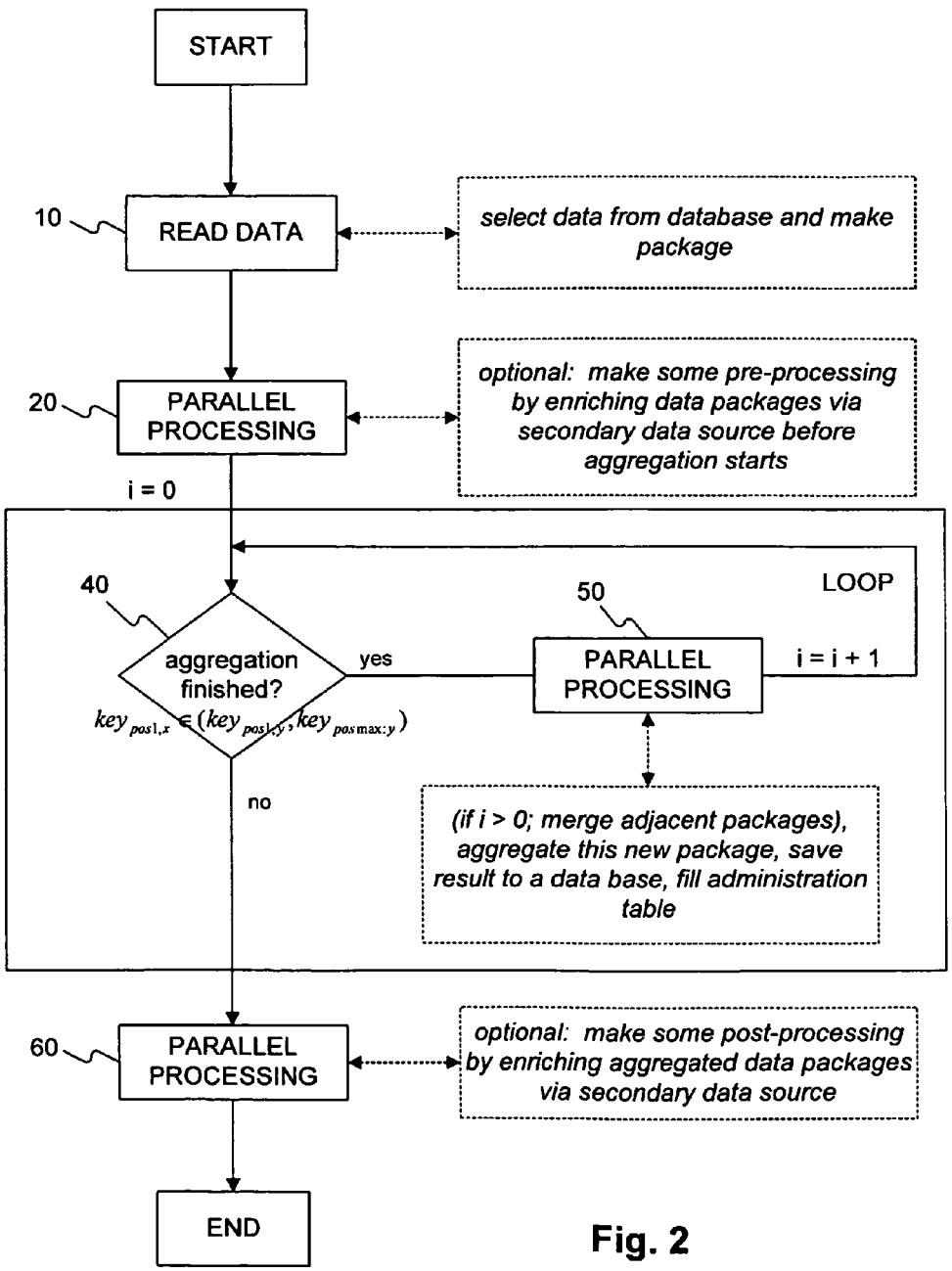
FIG. 2 illustrates a simplified flow chart of an exemplary computer-implemented method showing the steps for automated generic and parallel aggregation of characteristics and key figures of unsorted mass data.

FIG. 2 illustrates a simplified flow chart of an exemplary computer-implemented method showing the steps for automated generic and parallel aggregation of characteristics and key figures of unsorted mass data.

In step 10, the computer-implemented method begins with a selection of investigated mass data ("input data") including said plurality of M data records to be aggregated, said mass data being provided by different accessible primary databases of different accessible data sources. Having finished the selection of mass data due to selection criteria, the variously selected blocks of packetized mass data are assigned among each other and the result of assignment is stored to a global database.

Thereupon, some customizing of the selected mass data is required for defining granularity characteristics and aggregation operations to be carried out by the processing means of a data processing system for computing fields of key figures.

Moreover, the selected mass data are prepared as data packages according to a customer defined package size including $M_p < M$ data records in a pre-processing step before reading said mass data into the processing means of a data processing system.

In step 20, the packaged data can be additionally enriched in a parallel pre-processing with data from an accessible single secondary database or from accessible secondary databases, subsequently saving the results of enrichment to those local databases of the respective data processors where the data are to be processed.

Subsequent to the packaging, the data packages are read into the data processing means of a data processing system to be processed within jobs, each of the jobs including a plurality of data packages.

A job or a plurality of jobs can be processed in a parallel processing mode either using a single data processor or a network of data processors.

Up to this point, there is not identified one granularity level i corresponding to i=0. By assigning the data packages to the parallel aggregation algorithm 30, a first parallel processing begins with step 40, wherein at first said customized granularity characteristics are identified so as to obtain levels i of granularity characteristics. Having identified said granularity characteristics within said data packages, thereby accomplishing the criterion i>0, the records of each data package are sorted for a given order of said granularity characteristics, and subsequently aggregated for said key figures by using customized aggregation operations, thereby reducing the amount of records in said data packages to $N_a < M_p$ (smaller than the maximum size $M_p$). Following the aggregation, the results of each aggregated data package are saved to those local databases of the respective data processors where the data are processed. Thereupon, the aggregated packages are split into several smaller sub packages including $N_{sp}$ data records and the size (number of records) and the first and the last record of each sub data package is stored to a global result database. Hereafter, the identification of adjacent packages based on these small sub data packages is executed by checking the termination criterion for the loop i=i+1 ("not in parallel") being:

if $key_{pos1,x} \in (key_{pos1,y}; key_{posmax,y})$ then continue else terminate, wherein pos1 illustrates the first position of a data package, posmax illustrates the last position of a data package, and x, y illustrates the number of a data package, thereby comparing the key of the first record of each data package with the first and the last record of all the rest of data packages (thus comparing all combinations x, y). If said criterion for terminating the loop i=i+1 is not accomplished, meaning that the conditional inquiry is true, the data packages are assigned for rebuilding new data packages.

The underlying idea of splitting aggregated data packages into sub data packages is to improve the expressiveness of key information, and thereby to improve the identification of adjacent data packages based on their respective key information. Since only the data package size and the key information of the first and the last record of each data package are stored to a global database while all other data records are not considered, the following interests working in opposite directions must be kept in mind. While large package sizes are ideal for aggregation, the key information of the first and the last record of each large data package is not representative for all the rest of data records within said data package. On the other hand, if the data packages are very small, then the first and last record of each data package is more or less representative for all the rest of data records. But by reducing package sizes, the efficiency of aggregation diminishes due to the fact that there is not much to aggregate in small data packages.

Thus, the point is to meet the above-identified two interests working in opposite direction by approaching an efficient compromise of performance allowing to aggregate relatively large data package sizes, and subsequently split the aggregated data packages into smaller sub packages for the purpose of identifying adjacent sub data packages.

The relation of the maximum data package size $M_p$ and the size of sub data packages $N_{sp}$ depends on the degree of fragmentation and the degree of aggregation of the unsorted input data.

The effect of this approach of splitting aggregated data packages into sub data packages becomes the more important the less sorted the input data are, and the lower the degree of aggregation is, or in other words, the lower the reduction of the number of data records is.

In step 50, the aggregated packages may be assigned to a second parallel processing of the aggregation algorithm 30 for merging adjacent packages, thereby rebuilding new data packages, wherein adjacent packages are those packages with keys of the first record which are closest together. By merging these small data packages the maximum allowed package size $M_p$ is restored again. Hereupon, the new data packages (merged packages) are stored to local databases of the respective data processors where the data are processed. Subsequently, the new data packages are assigned again to the above mentioned first parallel processing for reorganizing and sorting, and thereafter aggregating said new data packages for key figures by using said customized aggregation operations.

After each loop cycle, the conditional inquiry for terminating the loop i=i+1 is checked for all combinations (x, y) anew, repeatedly executing the loop i=i+1 while the termination criterion is not accomplished, meaning that the conditional inquiry is true, else; after accomplishing said criterion, i.e., all the data packages are disjoint with regard to the granularity characteristics, terminating the loop.

Finally, the packaged data can be additionally enriched in a parallel post-processing step 60 with data from an accessible secondary database or from accessible secondary databases, subsequently saving the results of data packages to a global result database.

Figure 3:
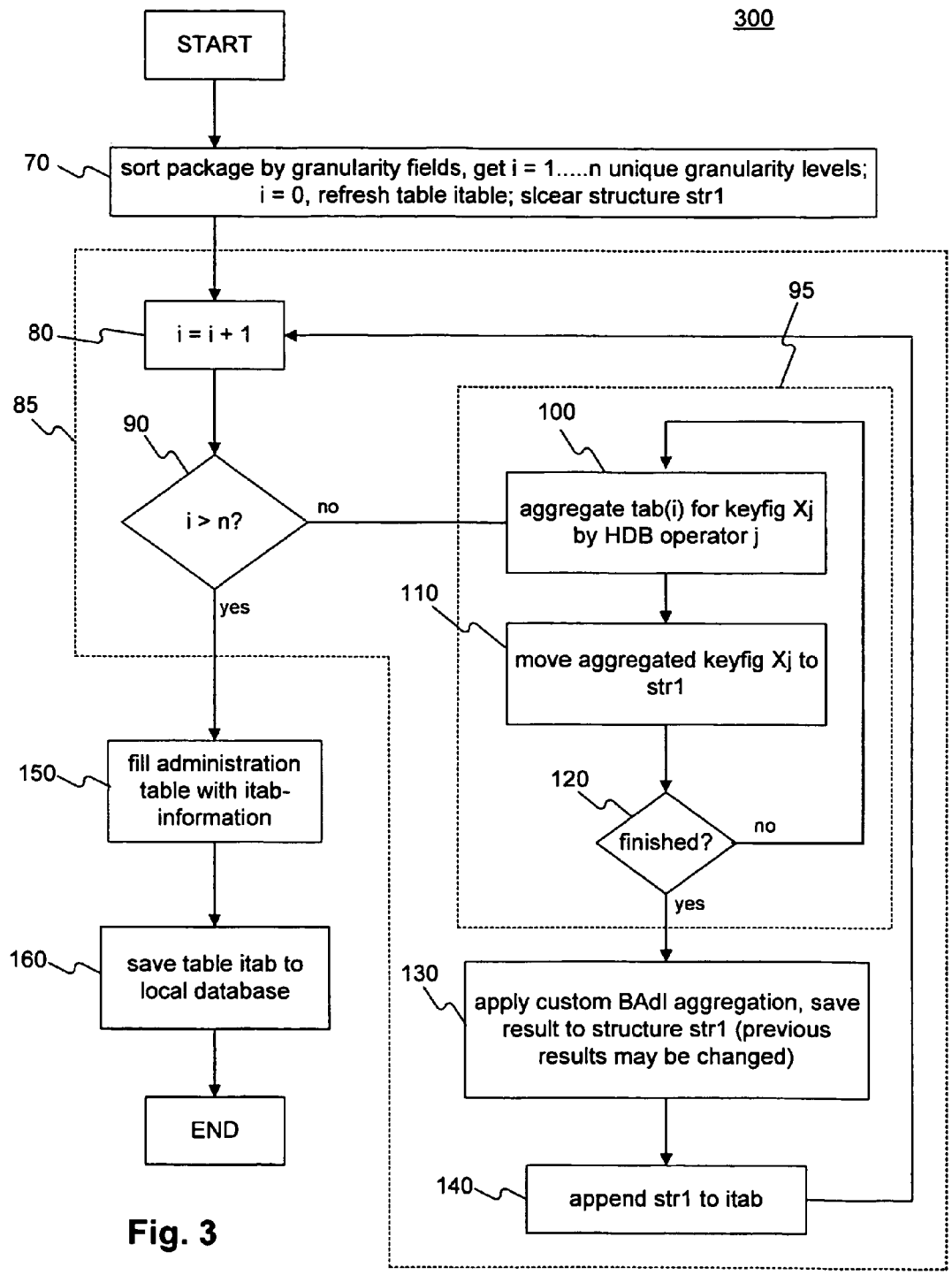
FIG. 3 illustrates a flow chart of an exemplary method showing the steps for the aggregation of records within a single data package.

FIG. 3 illustrates a flow chart of an exemplary method, consistent with an embodiment of the invention, showing the steps for the aggregation of records within a single data package after entering the aggregation algorithm 30 of FIG. 2, for example. At first, in step 70, there is not identified one level of granularity characteristics, which is symbolized by i=0. Furthermore, before aggregating for the first time within the scope of a first iteration, the summary table referred to as itab in which the aggregation result is stored to is empty. At this point, the records within the data package are assigned to a first parallel processing, wherein the fields of granularity characteristics are identified according to a customer defined granularity so as to obtain levels i (i=1 . . . n) of identified granularity characteristics. Having identified said granularity characteristics, thereby accomplishing the criterion i>0, the records of said data package are sorted for a given order of said granularity characteristics as, for example, illustrated in FIG. 5 referring to "search result".

By entering the loop 85, the records are assigned to the approach for sequentially aggregating the unique granularity levels i using predetermined and customized aggregation operations. Beginning with the first granularity level i=1 in step 80, the level i=1 is compared with the maximum level n inquiring the condition being (i>n?) in step 90. As long as the condition (i>n?) is not accomplished, meaning that the conditional inquiry is false, and thus i having a value less than or equal n, in method step 100, the records of the data package tab(i) corresponding to the appropriate granularity level i=1 are aggregated for a specific key figure Xj by using predetermined aggregation operations (operator j), thereby entering an internal loop 95.

Subsequently, in step 110, the aggregated key figure Xj is moved to the structure str1. Thereafter, in step 120, it is inquired if the aggregation of data records for key figures in respect to the appropriate granularity level i=1 is completed. If the conditional inquiry is not accomplished, the records of the data package corresponding to level i=1 are assigned again to a subsequent aggregation in respect to another key figure using another operation, repeatedly executing this approach of aggregation steps until all selected aggregation operations are conducted, else, leaving the internal loop 95.

In step 130, customer defined aggregation operations can be applied using, for example, an SAP-BAdI aggregation technique (commercially available form SAP AG Walldorf, Germany), subsequently saving the results to the structure str1, wherein previous results may be changed. Thereupon, having completed the aggregation algorithm for the appropriate level i=1, the structure str1 is appended to the summary table itab. This approach for executing the loop 85 is to be applied to all remaining granularity levels i up to and including the maximum number of i (i=2, 3, 4 . . . n).

By accomplishing said criterion in step 90 for leaving the loop 85 being (i>n?), in step 150, a global administration table is filled with itab-information. Finally, in step 160, the summary table referred to as itab is saved to a local database.

FIG. 4a illustrates an example of use for raw data showing a work list including M=12 records associated with, for instance, financial institutions and with financial affairs in banking practice to be applied to the parallel aggregation algorithm 30 of FIG. 2, for example. The work list includes sets of rows and sets of columns, each row corresponding to a record, and the columns including fields of predetermined granularity characteristics, and fields of predetermined key figures.

Furthermore, the records are sorted according to a given order of granularity characteristics as set out in FIG. 4b under granularity characteristics/"granularity levels i of granularity characteristics".

FIG. 5 illustrates an example of use for the aggregation using a processing tool based on the parallel aggregation algorithm 30 of FIG. 2, for example. The aggregation of the raw data illustrated in FIG. 4a including M=12 data records reduces the amount of data to 4<M=12 data records according to the customer defined granularity, as it is set out in FIG. 5 referring to "search result".

The granularity fields including granularity characteristics are characterized by "rating method" and "rating segment". The fields of key figures are characterized by the columns "financial statement key FIG. 1" and "financial statement key FIG. 2".

The data package size is determined through customizing. Contrary to the preceding statement that large data package sizes are ideal for aggregation, whereas small data package sizes are ideal for reorganization, in this example of use only one single package size can be determined, meaning that the data package size $M_p$ for aggregation is identical to the sub data package size $N_{sp}$ for reorganization. Therefore, in this example of use a less efficient compromise of performance has to be chosen to meet said opposite demands. The customized package size is determined by $M_p=4$ corresponding to the maximum number of granularity levels i, as it is shown in the table of FIG. 5 referring to "search result."

In step 200 (see, e.g., Table 2 below and FIG. 7A), the raw data shown in the original work list of FIG. 4a are exemplarily arranged by the key figures in the column "financial statement key FIG. 1" in ascending order so as to demonstrate a work list of unsorted records to begin with. Due to the customized data package size of $M_p=4$, the M=12 data records of said work list are split in three data packages, in data package 1, data package 2 and data package 3, each data package as a result having 4 data records.

Furthermore, for the exemplification of the parallel aggregation algorithm as illustrated in the example of FIG. 2 on the basis of the concrete example and to simplify matters, only the granularity fields characterized by "rating method" and "rating segment", the fields of key figures characterized by the columns "financial statement key FIG. 1" and "financial statement key FIG. 2", and the field currency are taken into consideration. All the rest of fields remain empty. Hereinafter, Table 2 illustrates the outcome of this reorganization and simplification of said original work list shown in FIG. 4a.

TABLE 2

Step: 200

| rating method | rating-segment | financial statement key FIG. 1 | financial statement key FIG. 2 | currency | package |
|---|---|---|---|---|---|
| insurances | life insurances | 1620 | 865860 | EUR | 1 |
| credit institutions | Landesbanken (form of banks) | 1912 | 809485 | EUR | 1 |
| credit institutions | Sparkassen (form of banks) | 2860 | 456825 | EUR | 1 |
| credit institutions | Sparkassen (form of banks) | 3254 | 693677 | EUR | 1 |
| insurances | casualty insurances | 3346 | 729541 | EUR | 2 |
| credit institutions | Landesbanken (form of banks) | 3393 | 542616 | EUR | 2 |
| insurances | life insurances | 5966 | 670365 | EUR | 2 |
| credit institutions | Landesbanken (form of banks) | 6135 | 166310 | EUR | 2 |
| credit institutions | Sparkassen (form of banks) | 8149 | 484449 | EUR | 3 |
| insurances | casualty insurances | 8683 | 824001 | EUR | 3 |
| insurances | life insurances | 8715 | 247374 | EUR | 3 |
| insurances | casualty insurances | 8916 | 35040 | EUR | 3 |

In step 210 (see, e.g., FIG. 7A), the data packages are assigned to the parallel processing of the aggregation algorithm 30 of FIG. 2. Within the scope of a first iteration (Iteration Nr. 1), the parallel processing begins with the method step 40 of FIG. 2. Up to this point, there is not identified one granularity level i mentioned above, which is symbolized by i=0 in FIG. 2. Therefore, at first, the fields of granularity characteristics labeled "rating method" and "rating segment" are identified so as to obtain levels i of granularity characteristics within said data packages, thereby accomplishing the criterion i>0. The maximum reachable number of granularity levels i per data package is i=4 due to the table of FIG. 5 mentioned above. By sequentially comparing the above mentioned granularity characteristics shown in the table of FIG. 5 with the data records of each of the three data packages, thereby beginning with the first row of granularity characteristics of the table of FIG. 5 characterized through "credit institutions/private banks" and ending with the forth row characterized through "insurances/casualty insurances", in the example of use there appear in total three matches in each of the three data packages, what as a result corresponds to a granularity level of i=3 of identified granularity characteristics for each data package.

Subsequently, the data records within all of the three data packages are sorted according to the given order as set out in the table of FIG. 5. The outcome of this sorting is illustrated below in Table 3.

TABLE 3

Step: 200

| rating method | rating-segment | Sum financial statement key FIG. 1 | Minimum financial statement key FIG. 2 | currency | package |
|---|---|---|---|---|---|
| credit institutions | private banks | 1912 | 809485 | EUR | 1 |
| credit institutions | public banks | 3254 | 693677 | EUR | 1 |
| credit institutions | public banks | 2860 | 456825 | EUR | 1 |
| insurances | life insurances | 1620 | 865860 | EUR | 1 |
| credit institutions | private banks | 6135 | 166310 | EUR | 2 |
| credit institutions | private banks | 3393 | 542616 | EUR | 2 |
| insurances | life insurances | 5966 | 670365 | EUR | 2 |
| insurances | casualty insurances | 3346 | 729541 | EUR | 2 |
| credit institutions | public banks | 8149 | 484449 | EUR | 3 |
| insurances | life insurances | 8715 | 247374 | EUR | 3 |
| insurances | casualty insurances | 8683 | 824001 | EUR | 3 |
| insurances | casualty insurances | 8916 | 35040 | EUR | 3 |

As illustrated in Table 3, the first two rows of data package 1 and data package 2 appear to have identical granularity characteristics. In data package 3, the last two rows include identical granularity characteristics.

Thereafter, these rows are aggregated for the key figures (Xj) characterized through "financial statement key FIG. 1" and "financial statement key FIG. 2" by applying appropriate aggregation operations (operators j) to the respective key figures, wherein said aggregation operations being predetermined or customized aggregation operations. In this case the matches are added up in respect to key FIG. 1, and in respect to key FIG. 2 the minimum value is taken over. All three data packages are processed simultaneously due to the parallel processing. As a result, the number of data records within all of the three data packages is reduced to $N=3<M_p=4$ data records, which is illustrated below in Table 4.

TABLE 4

Step: 210

| rating method | rating-segment | Sum financial statement key FIG. 1 | Minimum financial statement key FIG. 2 | currency | package |
|---|---|---|---|---|---|
| credit institutions | private banks | 1912 | 809485 | EUR | 1 |
| credit institutions | public banks | 6114 | 456825 | EUR | 1 |

TABLE 4-continued

Step: 210

| rating method | rating-segment | Sum financial statement key FIG. 1 | Minimum financial statement key FIG. 2 | currency | package |
|---|---|---|---|---|---|
| insurances | life insurances | 1620 | 865860 | EUR | 1 |
| credit institutions | private banks | 9528 | 166310 | EUR | 2 |
| insurances | life insurances | 5966 | 670365 | EUR | 2 |
| insurances | casualty insurances | 3346 | 729541 | EUR | 2 |
| credit institutions | public banks | 8149 | 484449 | EUR | 3 |
| insurances | life insurances | 8715 | 247374 | EUR | 3 |
| insurances | casualty insurances | 17599 | 35040 | EUR | 3 |

Thereupon, in step 220 (see, e.g., FIG. 7B), after saving the results of each data package in a database, the identification of adjacent data packages is conducted by checking the termination criterion of the loop i=i+1 ("not in parallel") being:

if $key_{pos1,x} \in (key_{pos1,y}; key_{posmax,y})$ then continue else terminate, wherein pos1 illustrates the first position of a data package, posmax illustrates the last position of a data package, and x, y illustrates the number of a data package, thereby comparing the key of the first record of each data package with the key of the first and the last record of all the rest of data packages (thus comparing all combinations x, y). If said criterion is not accomplished, meaning that the conditional inquiry is true, the data packages are assigned for rebuilding new data packages.

Beginning with the key of the first record of data package 1, the comparison of data package 1 and data package 2 results in that the key of the first record of data package 1 is equal to the key of the first record of data package 2. As a result, interpreting the conditional inquiry for the loop, the key of the first record of data package 1 is an element of the amount of data in data package 2, or furthermore interpreted, data package 1 and data package 2 intersect, and thus they are identified as adjacent packages. Consequently, as the termination criterion for the loop is not accomplished, data package 1 and data package 2 are assigned for rebuilding a new data package 1. Since data package 1 and data package 2, respectively, include 3 records, the data package size of the new data package 1 including $M_m=6$ records exceeds the maximum package size of $M_p=4$, which is acceptable. The data package 3 remains unmodified.

In step 230 (see, e.g., FIG. 7B), the aggregated data packages are assigned to the second parallel processing of the aggregation algorithm 30 of FIG. 2 illustrated by the step 50 within the scope of a second iteration (Iteration Nr. 2) for merging the adjacent data packages of step 210. Having merged said data package 1 and data package 2 to a new data package 1, the data records of the remaining two data packages are assigned again to the above mentioned first parallel process illustrated by step 40 of FIG. 2 within the scope of a second iteration (Iteration Nr. 2), wherein the data records of the remaining two data packages are reorganized in parallel processing mode, and thereafter sorted again according to the given order for said granularity characteristics as illustrated in the table of FIG. 5 and in FIG. 4b, respectively. This outcome of this reorganization and sorting is illustrated hereinafter in Table 5.

TABLE 5

Step: 230

| rating method | rating-segment | Sum financial statement key FIG. 1 | Minimum financial statement key FIG. 2 | currency | old package | new package |
|---|---|---|---|---|---|---|
| credit institutions | private banks | 1912 | 809485 | EUR | 1 | 1 |
| credit institutions | private banks | 9528 | 166310 | EUR | 2 | 1 |
| credit institutions | public banks | 6114 | 456825 | EUR | 1 | 1 |
| insurances | life insurances | 1620 | 865860 | EUR | 1 | 1 |
| insurances | life insurances | 5966 | 670365 | EUR | 2 | 1 |
| insurances | casualty insurances | 3346 | 729541 | EUR | 2 | 1 |
| credit institutions | public banks | 8149 | 484449 | EUR | 3 | 2 |
| insurances | life insurances | 8715 | 247374 | EUR | 3 | 2 |
| insurances | casualty insurances | 17599 | 35040 | EUR | 3 | 2 |

Thereupon, the aggregation for the key figures using the predetermined aggregation operations is conducted anew, wherein as a result, the size of the new data package 1 decreases from $M_m=6$ to $N_a=4$ according to the customer defined granularity as illustrated in FIG. 5 referring to "search result". Following the aggregation, the results of the remaining data packages are saved in a database. The outcome of this aggregation is illustrated hereinafter in Table 6.

TABLE 6

Step: 230

| rating method | rating-segment | financial statement key FIG. 1 | financial statement key FIG. 2 | currency | package |
|---|---|---|---|---|---|
| credit institutions | private banks | 11400 | 166310 | EUR | 1 |
| credit institutions | public banks | 6114 | 456825 | EUR | 1 |
| insurances | life insurances | 7586 | 670365 | EUR | 1 |
| insurances | casualty insurances | 3346 | 729541 | EUR | 1 |
| credit institutions | public banks | 8149 | 484449 | EUR | 2 |
| insurances | life insurances | 8715 | 247374 | EUR | 2 |
| insurances | casualty insurances | 17599 | 35040 | EUR | 2 |

In step 240 (see, e.g., FIG. 7C), the termination criterion for the loop i=i+1 for the remaining two data packages is checked anew ("not in parallel"). In this case, the comparison of data package 1 and data package 2 results in that the key of the first record of data package 2 is greater than the key of the first record of data package 1, and that the key of the last record of data package 1 is greater than said key of the first record of data package 2, which represents intersecting data packages. As a result, the termination criterion is not accomplished, consequently assigning the data package 1 to data package 2 for rebuilding a new data package 1. Since data package 1 includes 4 records and data package 2 includes 3 records, the data package size of the new data package 1 including $M_m=7$ records exceeds the maximum package size of $M_p=4$, which is acceptable.

In step 250 (see, e.g., FIG. 7C), the aggregated data packages are assigned again to the second parallel processing of the aggregation algorithm 30 of FIG. 2 illustrated by the step 50 within the scope of a third iteration (Iteration Nr. 3) for merging said adjacent data packages of step 230. Having merged the data package 1 and data package 2 to a new data package 1, the data records of the remaining new data package 1 are reorganized, and thereafter sorted again according to the given order for said granularity characteristics as illustrated in the table of FIG. 5 and in FIG. 4b, respectively. The outcome of this reorganization and sorting is illustrated hereinafter in Table 7.

TABLE 7

Step: 250

| rating method | rating-segment | Sum financial statement key FIG. 1 | Minimum financial statement key FIG. 2 | currency | old package | new package |
| --- | --- | --- | --- | --- | --- | --- |
| Kreditinstitute | private banks | 1140 | 166310 | EUR | 1 | 1 |
| Kreditinstitute | public banks | 6114 | 456825 | EUR | 1 | 1 |
| Kreditinstitute | public banks | 8149 | 484449 | EUR | 2 | 1 |
| Versicherungen | life insurances | 7586 | 670365 | EUR | 1 | 1 |
| Versicherungen | life insurances | 8715 | 247374 | EUR | 2 | 1 |
| Versicherungen | casualty insurances | 3346 | 729541 | EUR | 1 | 1 |
| Versicherungen | casualty insurances | 17599 | 35040 | EUR | 2 | 1 |

Thereupon, the aggregation for said key figures using said predetermined aggregation operations is conducted just once more by assigning said data records to the first parallel process illustrated by method step 40 of FIG. 2 within the scope of a third iteration (Iteration Nr. 3), wherein as a result, the size of the new data package 1 decreases from $M_m=7$ to $N_a=4$ according to the customer defined granularity as illustrated in FIG. 5 referring to "search result". Following the aggregation, the results of the remaining data packages are saved in a database. This outcome of this aggregation is illustrated hereinafter in Table 8.

TABLE 8

Step: 250

| rating method | rating-segment | financial statement key FIG. 1 | financial statement key FIG. 2 | currency | package |
| --- | --- | --- | --- | --- | --- |
| Kreditinstitute | private banks | 1140 | 166310 | EUR | 1 |
| Kreditinstitute | public banks | 14263 | 456825 | EUR | 1 |
| Versicherungen | casualty insurances | 16301 | 247374 | EUR | 1 |
| Versicherungen | casualty insurances | 20945 | 35040 | EUR | 1 |

By checking the termination criterion for the loop $i=i+1$ once again in step 260 ("not in parallel"), the aggregation algorithm 30 of FIG. 2 terminates at this point, since there is no other adjacent data package, whose first key is an element of any other data package, or in other words interpreting the termination criterion, all the data packages are disjoint with regard to the granularity characteristics.

FIG. 6 illustrates an example of use for an optimized aggregation algorithm compared to the preceding example of use of FIG. 5, using a processing tool based on the parallel aggregation algorithm 30 of FIG. 2. The aggregation of the raw data illustrated in FIG. 4a including M=12 data records reduces the amount of data to 4<M=12 data records according to the customer defined granularity, as it is set out in FIG. 5 referring to "search result".

The granularity fields including granularity characteristics are characterized by "rating method" and "rating segment". The fields of key figures are characterized by the columns "financial statement key FIG. 1" and "financial statement key FIG. 2".

The data package size is determined through customizing. According to the statement that large data package sizes are ideal for aggregating, whereas small data package seizes are ideal for reorganizing, in this example of use the data package size ($M_p$) for aggregating is determined relatively great with $M_p=8$ and the sub data package size ($N_{sp}$) is determined relatively low with $N_{sp}=3$, thereby complying with the interests working in opposite direction.

In step 200 (see, e.g., FIG. 8A), the raw data shown in the original work list of FIG. 4a are exemplarily arranged by the key figures in the column "financial statement key FIG. 1" in ascending order so as to demonstrate a work list of unsorted records to begin with. Due to the customized data package size of $M_p=8$, the M=12 data records of said work list are split in two data packages, in data package 1 for aggregating, including $M_p=8$ data records, and a remaining data package 2 corresponding to a remaining rest that is not to be aggregated, including 4 data records.

In analogy to the preceding example of use in FIG. 5, for the exemplification of the parallel aggregation algorithm as illustrated in FIG. 2 on the basis of the concrete example and to simplify matters, only the granularity fields characterized by "rating method" and "rating segment", the fields of key figures characterized by the columns "financial statement key FIG. 1" and "financial statement key FIG. 2", and the field currency are taken into consideration. All the rest of fields remain empty. Hereinafter, Table 9 illustrates the outcome of this reorganization and simplification of the original work list shown in FIG. 4a.

TABLE 9

Step: 200

| rating method | rating-segment | Sum financial statement key FIG. 1 | Minimum financial statement key FIG. 2 | currency | package |
|---|---|---|---|---|---|
| insurances | life insurances | 1620 | 865860 | EUR | 1 |
| credit institutions | private banks | 1912 | 809485 | EUR | 1 |
| credit institutions | public banks | 2860 | 456825 | EUR | 1 |
| credit institutions | public banks | 3254 | 693677 | EUR | 1 |
| insurances | casualty insurances | 3346 | 729541 | EUR | 2 |
| credit institutions | private banks | 3393 | 542616 | EUR | 2 |
| insurances | life insurances | 5966 | 670365 | EUR | 2 |
| credit institutions | private banks | 6135 | 166310 | EUR | 2 |
| credit institutions | public banks | 8149 | 484449 | EUR | 3 |
| insurances | casualty insurances | 8683 | 824001 | EUR | 3 |
| insurances | life insurances | 8715 | 247374 | EUR | 3 |
| insurances | casualty insurances | 8916 | 35040 | EUR | 3 |

In step 210 (see. e.g., FIG. 8A), the data packages are assigned to the parallel processing of the aggregation algorithm 30 of FIG. 2. Within the scope of a first iteration (Iteration Nr. 1), the parallel processing begins with the method step 40 of FIG. 2. Up to this point, there is not identified one granularity level i mentioned above, which is symbolized by i=0 in FIG. 2. Therefore, at first, the fields of granularity characteristics labeled "rating method" and "rating segment" are identified so as to obtain levels i of granularity characteristics within said data packages, thereby accomplishing the criterion i>0. The maximum reachable number of granularity levels i per data package is i=4 due to the table illustrated in the preceding example of FIG. 5.

By sequentially comparing the customer defined granularity characteristics shown in the table of FIG. 5 with the data records of each of the two data packages, thereby beginning with the first row of granularity characteristics of the table of FIG. 5 characterized through "credit institutions/private banks" and ending with the forth row characterized through "insurances/casualty insurances", the data records of data package 1 and data package 2 are searched for matching results. In our example of use there appear in total four matches in data package 1 and three matches in data package 2 in respect to said granularity characteristics and granularity levels i, respectively, what as a result corresponds to a granularity level of i=4 of identified granularity characteristics for data package 1 and i=3 for data package 2.

Subsequently, both of the data packages are sorted according to the given order as set out in the table of the preceding example of FIG. 5. The outcome of this sorting of data packages is illustrated below in Table 10.

TABLE 10

Step: 200

| rating method | rating-segment | Sum financial statement key FIG. 1 | Minimum financial statement key FIG. 2 | currency | package |
|---|---|---|---|---|---|
| credit institutions | private banks | 1912 | 809485 | EUR | 1 |
| credit institutions | private banks | 3393 | 542616 | EUR | 1 |
| credit institutions | private banks | 6135 | 166310 | EUR | 1 |
| credit institutions | public banks | 2860 | 456825 | EUR | 1 |
| credit institutions | public banks | 3254 | 693677 | EUR | 1 |
| insurances | life insurances | 1620 | 865860 | EUR | 1 |

TABLE 10-continued

Step: 200

| rating method | rating-segment | Sum financial statement key FIG. 1 | Minimum financial statement key FIG. 2 | currency | package |
|---|---|---|---|---|---|
| insurances | life insurances | 5966 | 670365 | EUR | 1 |
| insurances | casualty insurances | 3346 | 729541 | EUR | 1 |
| credit institutions | public banks | 8149 | 484449 | EUR | 2 |
| insurances | life insurances | 8715 | 247374 | EUR | 2 |
| insurances | casualty insurances | 8683 | 824001 | EUR | 2 |
| insurances | casualty insurances | 8916 | 35040 | EUR | 2 |

Subsequently, the rows of data package 1 are aggregated for the key figures (Xj) characterized through "financial statement key FIG. 1" and "financial statement key FIG. 2" by applying appropriate aggregation operations (operators j) to the respective key figures, wherein said aggregation operations being predetermined or customized aggregation operations. In this case the matches are added up in respect to key FIG. 1, and in respect to key FIG. 2 the minimum value is taken over, thereby reducing the number of data records. As a result, data package 1 is reduced to $N_a=4<M_p=8$ data records, which is illustrated below in Table 11.

TABLE 11

Step: 210

| rating method | rating-segment | Sum financial statement key FIG. 1 | Minimum financial statement key FIG. 2 | currency | package |
|---|---|---|---|---|---|
| credit institutions | private banks | 11440 | 166310 | EUR | 1 |
| credit institutions | public banks | 6114 | 456825 | EUR | 1 |
| insurances | life insurances | 7586 | 670365 | EUR | 1 |
| insurances | casualty insurances | 3346 | 729541 | EUR | 1 |
| credit institutions | public banks | 8149 | 484449 | EUR | 2 |
| insurances | life insurances | 8715 | 247374 | EUR | 2 |
| insurances | casualty insurances | 8683 | 824001 | EUR | 2 |
| insurances | casualty insurances | 8916 | 35040 | EUR | 2 |

Thereafter, the data packages are split into sub data packages and then the sub data packages are saved in a database. Since the sub data package size ($N_{sp}$) is determined by $N_{sp}=3$, each of the two remaining data packages including 4 data records is split in two sub data packages, wherein each of the sub data packages 1 and 3 includes 3 data records, and each of the sub data packages 2 and 4 corresponding to the rest of data package 1 and data package 2, respectively, only includes 1 data record. The outcome of this splitting of data packages into sub data packages is illustrated below in Table 12.

TABLE 12

| | | Step: 210 | | | | |
|---|---|---|---|---|---|---|
| rating method | rating-segment | financial statement key FIG. 1 | financial statement key FIG. 2 | currency | package old | package new |
| credit institutions | private banks | 11440 | 166310 | EUR | 1 | 1 |
| credit institutions | public banks | 6114 | 456825 | EUR | 1 | 1 |
| insurances | life insurances | 7586 | 670365 | EUR | 1 | 1 |
| insurances | casualty insurances | 3346 | 729541 | EUR | 1 | 2 |
| credit institutions | public banks | 8149 | 484449 | EUR | 2 | 3 |
| insurances | life insurances | 8715 | 247374 | EUR | 2 | 3 |
| insurances | casualty insurances | 8683 | 824001 | EUR | 2 | 3 |
| insurances | casualty insurances | 8916 | 35040 | EUR | 2 | 4 |

Thereupon, in step 220 (see, e.g., FIG. 8B), the identification of adjacent data packages based on these small sub data packages is conducted by checking the termination criterion of the loop i=i+1 ("not in parallel") being:

if $key_{pos1,x} \in (key_{pos1,y}; key_{posmax,y})$ then continue else terminate, wherein pos1 illustrates the first position of a data package, posmax illustrates the last position of a data package, and x, y illustrates the number of a data package, thereby comparing the key of the first record of each data package with the key of the first and the last record of all the rest of data packages (thus comparing all combinations x, y). If said criterion is not accomplished, meaning that the conditional inquiry is true, the data packages are assigned for rebuilding new data packages.

Beginning with the key of the first record of data package 1, the comparison of data package 1 and data package 2 results in that the key of the first record of data package 1 is less than the key of the single record of data package 2. As a result, interpreting the conditional inquiry for the loop i=i+1, data package 1 and data package 2 do not intersect. Accordingly, data package 1 and data package 4 do not intersect. In contrast, data package 1 and data package 3 appear to intersect, since the key of the first record of data package 2 is greater than the key of the first record of data package 1 and less than the key of the last record of data package 1, meaning that the key of the first record of data package 2 is an element of the amount of data records in data package 1. Thus, they are identified as adjacent data packages. Further, the keys of data package 2 and 4 are identical, and thus both packages are not disjoint. Accordingly, they are identified as adjacent data packages, too. Thereupon, the data packages identified as adjacent are assigned for rebuilding new data packages.

Since data package 1 and data package 2, respectively, only include 3 records, the data package size of the new data package 1 including 6 records is still less than the determined package size of $M_p=8$. The data package size of the new data package 2 includes 1+1=2 data records. In order to restore the original package size of $M_p=8$, the new data package 2 is additionally added to the new data package 1.

In step 230 (see, e.g., FIG. 8B), the sub data packages of step 210 are assigned to the second parallel processing of the aggregation algorithm 30 of FIG. 2 illustrated by the method step 50 within the scope of a second iteration (Iteration Nr. 2) for merging adjacent data packages and rebuilding new data packages, respectively. Thus, having merged sub data package 1 with sub data package 3, and sub data package 2 with sub data package 4, and additionally added the new data package 2 to the new data package 1, in all only one new data package remains. Subsequent to the merger, the data records are assigned again to the above mentioned first parallel process illustrated by step 40 of FIG. 2 within the scope of a second iteration (Iteration Nr. 2), wherein the data records of the remaining new data package 1 are reorganized, and thereafter sorted again according to the given order of said granularity characteristics as illustrated in the table of the preceding example of FIG. 5 and in FIG. 4b, respectively. The outcome of this reorganization and sorting is illustrated hereinafter in Table 13.

TABLE 13

| | | Step: 230 | | | | |
|---|---|---|---|---|---|---|
| rating method | rating-segment | Sum financial statement key FIG. 1 | Minimum financial statement key FIG. 2 | currency | package old | package new |
| credit institutions | private banks | 11440 | 166310 | EUR | 1 | 1 |
| credit institutions | public banks | 6114 | 456825 | EUR | 1 | 1 |
| credit institutions | public banks | 8149 | 484449 | EUR | 3 | 1 |
| insurances | life insurances | 7586 | 670365 | EUR | 1 | 1 |
| insurances | life insurances | 8715 | 247374 | EUR | 3 | 1 |
| insurances | casualty insurances | 3346 | 729541 | EUR | 2 | 1 |
| insurances | casualty insurances | 8683 | 824001 | EUR | 3 | 1 |
| insurances | casualty insurances | 8916 | 35040 | EUR | 4 | 1 |

Thereupon, the aggregation for the key figures using said predetermined aggregation operations is conducted just once more, wherein as a result, the size of the new data package 1 decreases from $M_p=8$ to $N_a=4$ according to the customer defined granularity as illustrated in FIG. 5 referring to "search result". This outcome of this aggregation is illustrated hereinafter in Table 14.

TABLE 14

Step: 230

| rating method | rating-segment | financial statement key FIG. 1 | financial statement key FIG. 2 | currency | package |
|---|---|---|---|---|---|
| credit institutions | private banks | 11440 | 166310 | EUR | 1 |
| credit institutions | public banks | 14263 | 456825 | EUR | 1 |
| insurances | life insurances | 16301 | 247374 | EUR | 1 |
| insurances | casualty insurances | 20945 | 35040 | EUR | 1 |

Following the aggregation, the results of the remaining data package are saved in a database.

By checking the termination criterion for the loop $i=i+1$ once again in step 240 (see, e.g., FIG. 8C), the aggregation algorithm 30 of FIG. 2 terminates at this point, since there is no other adjacent data package, whose first key is an element of any other data package, or in other words interpreting the termination criterion, all the data packages are disjoint with regard to the granularity characteristics.

FIGS. 7A through 7C and FIGS. 8A through 8C show exemplary work lists or tables consistent with embodiments the present invention.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A computer-implemented method for automated generic and parallel aggregation of characteristics and key figures of data associated with financial institutions and with financial affairs in banking practice, the method comprising:
   receiving, at a data processing system, mass data from a single database of a single data source or from different databases of different data sources, the mass data comprising a plurality of records, the records being associated with granularity characteristics and key figures;
   selecting, according to a customer-defined aggregation, granularity characteristics of the received mass data, key figures of the received mass data, and aggregation operations associated with the key figures;
   generating a plurality of data packages from the received mass data, the data packages comprising a plurality of records, the plurality of records of the data packages being smaller than the plurality of records of the received mass data;
   processing, using a processor of the data processing system, the data packages to reduce a number of records in the data packages according to the customer-defined aggregation, wherein the processing comprises:
      identifying a granularity level associated with the selected granularity characteristics, the identified granularity levels defining an order of the selected granularity characteristics;
      sorting the records of the data packages according to the defined order of granularity characteristics;
      aggregating the sorted records of the data packages for the selected key figures using the selected aggregation operations, the aggregation reducing the records of the data packages; and
      identifying adjacent data packages by comparing, for the aggregated data packages, a key of a first record of the aggregated data packages with a key of a first record and a key of a last record of the other aggregated data packages, the identifying comprising:
         computing termination criteria for pairs of the aggregated data packages, the termination criteria having the form:

$key_{pos1,x} \in (key_{pos1,y}; key_{posmax,y})$, wherein pos1 represents a first position of a data package, posmax represents a last position of a data package, and x and y represent numbers of data packages; and
         identifying adjacent packages based on a violation of corresponding ones of the termination criteria, the adjacent data packages having first record keys that are closest together; and
   saving, to a memory of the data processing system, the aggregated records of the data packages, wherein the stored records comprise fewer records than the received mass data at the customer-defined granularity.

2. The method of claim 1, wherein selecting comprises:
selecting the granularity characteristics from at least one of: (i) a predetermined granularity characteristic of the received mass data or (ii) a customer-defined granularity characteristic; and
selecting the key figures from at least one of: (i) a predetermined key figure associated with the received mass data or (ii) a customer-defined key figure.

3. The method of claim 1, wherein selecting comprises:
selecting the aggregation operation from a predetermined aggregation operation of a function pool and a customer defined aggregation operation.

4. The method of claim 1, further comprising:
enriching the generated data packages through parallel pre-processing using a secondary data source.

5. The method of claim 1, further comprising:
enriching the aggregated data packages through parallel post-processing using a secondary data source.

6. The method of claim 1, wherein processing further comprises processing the data packages in one or more jobs, the jobs comprising a plurality of the data packages.

7. The method of claim 6, wherein the jobs are processed in a parallel processing mode using a single processor.

8. The method of claim 6, wherein the jobs are processed in a parallel processing mode using a network of processors.

9. The method of claim 1, wherein processing further comprises, when adjacent data packages are identified:
merging the adjacent data packages to generate merged data packages; and
processing the merged data packages to reduce a number of records in the merged data packages according to the customer-defined aggregation.

10. The method of claim 1, wherein when no adjacent data packages are identified, the aggregated data packages are disjoint with respect to the selected granularity characteristics of the customer-defined granularity.

11. A computer system configured to perform automated generic and parallel aggregation of characteristics and key figures of data associated with financial institutions and with financial affairs in banking practice, comprising:
a module configured to receive mass data from a single database of a single data source or from different databases of different data sources, the mass data comprising a plurality of records, the records being associated with granularity characteristics and key figures;
a module configured to select, according to a customer-defined aggregation, granularity characteristics of the received mass data, key figures of the received mass data, and aggregation operations associated with the key figures;
a module configured to generate a plurality of data packages from the received mass data, the data packages comprising a plurality of records, the plurality of records of the data packages being smaller than the plurality of records of the received mass data;
a processor configured to process the data packages to reduce a number of records in the data packages according to the customer-defined aggregation, wherein the processor is further configured to:
identify a granularity level associated with the selected granularity characteristics, and the identified granularity levels defining an order of the selected granularity characteristics;
sort the records of the data packages according to the defined order of granularity characteristics;
aggregate the sorted records of the data packages for the selected key figures using the selected aggregation operations, the aggregation reducing the records of the data packages; and
identify adjacent data packages by comparing, for the aggregated data packages, a key of a first record of the aggregated data packages with a key of a first record and a key of a last record of the other aggregated data packages, the identifying comprising:
computing termination criteria for pairs of the aggregated data packages, the termination criteria having the form:

$key_{pos1,x} \in (key_{pos1,y}; key_{posmax,y})$, wherein pos1 represents a first position of a data package, posmax represents a last position of a data package, and x and y represent numbers of data packages; and
identifying adjacent packages based on a violation of corresponding ones of the termination criteria, the adjacent data packages having first record keys that are closest together; and
a memory configured to store the aggregated records of the data packages, wherein the stored records comprise fewer records than the received mass data at the customer-defined granularity.

12. The computer system of claim 11, wherein the one or more processors are further configured to enrich the generated data packages through parallel pre-processing using a secondary data source.

13. The computer system of claim 11, wherein the one or more processors are further configured to enrich the aggregated data packages through parallel post-processing using a secondary data source.

14. The computer system of claim 11, wherein when adjacent data packages are identified, the one or more processors are further configured to:
merge the adjacent data packages to generate one or more merged data packages; and
process the merged data packages to reduce a number of records in the merged data packages according to the customer-defined aggregation.

15. The computer system of claim 11, wherein when no adjacent data packages are identified, the aggregated data packages is disjoint with respect to the identified granularity characteristics of the received mass data.

16. A computer-readable storage medium comprising a plurality of instructions that, when executed by a processor, perform a method for automated generic and parallel aggregation of characteristics and key figures of data associated with financial institutions and with financial affairs in banking practice, the method comprising:
receiving mass data from a single database of a single data source or from different databases of different data sources, the mass data comprising a plurality of records, the records being associated with granularity characteristics and key figures;
selecting, according to a customer-defined aggregation, granularity characteristics of the received mass data, key figures of the received mass data, and aggregation operations associated with the key figures;
generating a plurality of data packages from the received mass data, the data packages comprising a plurality of records, the plurality of records of the data packages being smaller than the plurality of records of the received mass data;

processing the data packages to reduce a number of records in the data packages according to the customer-defined aggregation, wherein the processing comprises:
identifying a granularity level associated with the selected granularity characteristics, and the identified granularity levels defining an order of the selected granularity characteristics;
sorting the records of the data packages according to the defined order of granularity characteristics;
aggregating the sorted records of the data packages for the selected key figures using the selected aggregation operations, the aggregation reducing the records of the data packages; and
identifying adjacent data packages by comparing, for the aggregated data packages, a key of a first record of the aggregated data packages with a key of a first record and a key of a last record of the other aggregated data packages, the identifying comprising:
computing termination criteria for pairs of the aggregated data packages, the termination criteria having the form:

$key_{pos1,x} \epsilon key_{pos1,y}; key_{posmax,y})$, wherein pos1 represents a first position of a data package, posmax represents a last position of a data package, and x and y represent numbers of data packages; and
identifying adjacent packages based on a violation of corresponding ones of the termination criteria, the adjacent data packages having first record keys that are closest together; and saving the aggregated records of the data packages, wherein the stored records comprise fewer records than the received mass data at the customer-defined granularity.

17. The computer-readable storage medium of claim 16, the method further comprising:
enriching the generated data packages through parallel pre-processing using a secondary data source.

18. The computer-readable storage medium of claim 16, the method further comprising:
enriching the aggregated data packages through parallel post-processing using a secondary data source.

19. The computer-readable storage medium of claim 16, wherein processing further comprises, when adjacent data packages are identified:
merging the adjacent data packages to generate one or more merged data packages; and
processing the merged data packages to reduce a number of records in the merged data packages according to the customer-defined aggregation.

20. The computer-readable storage medium of claim 16, wherein when no adjacent data packages are identified, the aggregated data packages are disjoint with respect to the identified granularity characteristics of the received mass data.

* * * * *